United States Patent [19]

Reiner

[11] 4,171,468

[45] Oct. 16, 1979

[54] METHOD AND APPARATUS FOR REMOTE CONTROL

[75] Inventor: Robert Reiner, Neubiberg, Fed. Rep. of Germany

[73] Assignee: Siemens Aktiengesellschaft, Berlin & Munich, Fed. Rep. of Germany

[21] Appl. No.: 853,900

[22] Filed: Nov. 22, 1977

[30] Foreign Application Priority Data

Nov. 23, 1976 [DE] Fed. Rep. of Germany ....... 2653202

[51] Int. Cl.[2] ............................................. H04J 7/00

[52] U.S. Cl. ............................. 179/15 AW; 325/314; 325/391; 325/395; 340/167 R

[58] Field of Search .................... 179/15 AW, 15 BA; 340/167 R; 325/55, 390, 391, 314, 395

[56] References Cited

U.S. PATENT DOCUMENTS 3,197,563 7/1965 Hamsher ......................... 179/15 BA
3,852,713 12/1974 Roberts ........................... 340/167 R
3,942,152 3/1976 Pettersson .................... 179/15 AW

FOREIGN PATENT DOCUMENTS 2554637 6/1977 Fed. Rep. of Germany .

*Primary Examiner*—David L. Stewart
*Attorney, Agent, or Firm*—Hill, Van Santen, Steadman, Chiara & Simpson

[57] ABSTRACT

A method is disclosed for remote control wherein coded commands are transmitted from a transmitter to a receiver. A respective time interval between a first energy impulse starting the transmission and a second energy impulse concluding the transmission is utilized as the coding which characterizes the individual command. Time intervals rigidly allotted to the individual commands are selected differently such that the differences formed by subtracting the time intervals have at least partially different values in relation to one another. The remote control is particularly useful for remote control hobby equipment.

17 Claims, 4 Drawing Figures

| | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 |
| 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 |
| 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 |
| 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 |

METHOD AND APPARATUS FOR REMOTE CONTROL

BACKGROUND OF THE INVENTION

The invention relates to a method and apparatus for remote control by means of transmitting coded commands from a transmitter to a receiver in which the respective interval time span between a first energy impulse, starting the transmission, and a second energy impulse concluding the transmission is utilized as code for identifying the individual command.

Such a method for remote control is described in the German Offenlegungsschrift No. 2,554,637. The time intervals allotted to the commands of the command inventory provided in aggregate for the remote control are staggered differently such that in a command inventory having a total of n commands (n−1) total differences can be formed from the n established intervals which are assigned to said commands, said intervals having the same value. Indeed, a rigidly prescribed integral number p from the multitude of integral numbers 1 . . . n is assigned to each command provided in the command inventory whereby p represents a particular value for each command. Then, during the transmission of the p-th command, the final impulse must not be emitted earlier than at the point in time $$t_p=A+(p-1)a \qquad (1)$$

and not later than at the point in time $$T_p=A+p\cdot a \qquad (2)$$

after the occurrence of the starting impulse so the command can be identified on the receiver side. Therefore, a and A are constant time values, whereby A can also obviously have the value $\phi$. The tolerance permissible for the transmission is formed by the differential $T_p-t_p=a$. Said tolerance obviously has the same value of a for all commands.

Therefore, however, the required technical expense rises considerably for the synchronization of the circuits responsible for the time interval between the starting impulse and final impulse on the transmitter side and circuits recognizing the number p and thus the transmitted command on the receiver side. This requires a considerable increase in production costs which one should like to avoid, particularly in simpler devices of this type such as in the toy industry. On the other hand, nevertheless one is interested in sufficient operational safety for the device.

SUMMARY OF THE INVENTION

According to the invention the time intervals rigidly allotted to the individual commands are selected differently such that the time differentials formed by the subtraction of the time intervals receive at least partially different values, particularly in relation to one another. In other words, for different values of p and thus for the different commands of the command inventory, advantageously all differentials $(T_p-t_p)$ must have different values.

One is able, for example, to stagger the tolerance permissible for the transmission of the final impulse, in proportion to the number p of the command for the transmission of the p-th command. This means that the final impulse in the transmission of the p-th command need not be sent earlier than at the point in time $$t_p=A+a(p-1)p/2 \qquad (3)$$

and not later than at the point in time $$T_p=A+a(p+1)p/2 \qquad (4)$$

so the command is "understood" as the p-th command on the receiver side and not perhaps as the (p−1)-th command or the (p+1)-th command. The time interval which is at the disposal for the final impulse thus is not equal to a as in the above-mentioned method, but rather is equal to a·p.

However, it is particularly advantageous if in the inventive method if the time intervals between the starting impulse and the final impulse necessary for the transmission of the individual commands are staggered such that during the transmission of the command number p the final impulse need not appear earlier than at the point of time $$t_p = A + a\cdot\sum_{\nu=0}^{p-1} 2^{\nu} = A + a(2^p-1) \qquad (5)$$

and not later than at the point of time $$T_p = A + a\cdot\sum_{\nu=0}^{p} 2^{\nu} = A + a(2^{p+1}-1)\,. \qquad (6)$$

Accordingly the tolerance allotted to the p-th command is provided by the interval of $$T_p-t_p=a\cdot 2^p. \qquad (7)$$

Then one indeed can fully utilize the advantages of a digital control particularly because the evaluation on the receiver side can also be considerably facilitated. With the invention the time span window $T_p-t_p$ progressively increases with increasing impulse pair member.

One can directly recognize from the two sample embodiments that an increase of the "recognition safety" on the receiver side is guaranteed by the staggering of tolerances which can be used for the increase of operating safety even in less expensive devices. The technical expense required to obtain such a staggering is considerably lower than would be required for obtaining an exact synchronization of the time measurements on the transmitter and receiver side. If one additionally determines the P numbers to be allotted to the individual command in accordance with the frequency of their expected occurrence it is guaranteed that in spite of the staggered tolerances (the relative tolerances Δt/t remain approximately 100% for all commands) with respect to the first described technique, the time delay set with A and a is of no importance.

However, the invention relates not only to a method but also to a device for remote control utilizing the method.

A device for carrying out the inventive method for remote control has a transmitter for emitting energy impulses. The transmitter is equipped for the reproducible production of at least two types of impulse pairs such that the time interval between the first and the second impulse of the impulse pairs is only apportioned equally if the impulse pairs belong to the same type. The differences between the time intervals associated with the different types of impulse pairs including the smallest of said intervals form a completed number of time values all having different elements. The receiver has a sensor responding to the energy impulses transmitted by the transmitter and also a discriminator tuned to the individual types of impulse pairs and controlled by the sensor. The discriminator recognizes the time interval represented by the transmitted impulse pair transmitted. The receiver also has at least one element controlled by the discriminator which carries out the command recognized on the basis of the time interval transmitted.

Thus, to each type of impulse pair a specific command is assigned. This specific command is not executed until the corresponding type of impulse pair is transmitted at least once from the transmitter to the receiver. If the executing element of the receiver is structured so that the element flips from a first stable operating condition into a second stable operating condition when the command is executed, the transmission of only a single impulse pair assigned to the command is obviously sufficient in order to execute the command. However, care has to be taken by means of corresponding techniques that the executing element returns to the output condition. It is simpler if the executing element automatically assumes its earlier operating condition (thus its initial condition) after the command is executed.

For the production of the different types of impulse pairs, a special generator, for example, can be provided in the transmitter. A selection device provided in the transmitter, for example, in the fashion of a telephone selector, calls the generator when the command assigned to the generator is transmitted. The generator is then activated. However, such as design would require expensive equipment. It is therefore recommended to equip an impulse generator provided in the transmitter and used for the production of impulse pairs with at least two different operating conditions such that this impulse generator produces one or more impulse pairs of the first type during the first of said operating conditions, and produces one or more impulse pairs of the second type during the second of said operating conditions.

Finally, the transmitter side can also be structured such that a first impulse generator is provided to produce the starting impulses after the selection is completed, and a second impulse generator is provided to produce the final impulses. A time control member is provided between the two impulse generators such that it produces the associated final impulse set in a respectively specific manner via the command selector in an interval dependent upon the setting of the time control member after the starting impulse has appeared. The discriminator is then equipped with a time measuring member similar to the time control member on the receiver side, said time measuring member recording the respectively determined result, that is the interval between the respectively received starting impulse and final impulse.

The time control member, which corresponds to the time measuring member on the receiver side, is then preferably structured so that it functions like a stop watch whose operating speed is continuously or step-by-step decreased with an increased length of the respectively turned on condition. This is the case in the devices for remote control in accordance with the present invention as illustrated in FIGS. 2 and 3.

DESCRIPTION OF THE PREFERRED EMBODIMENTS

Figure 1:
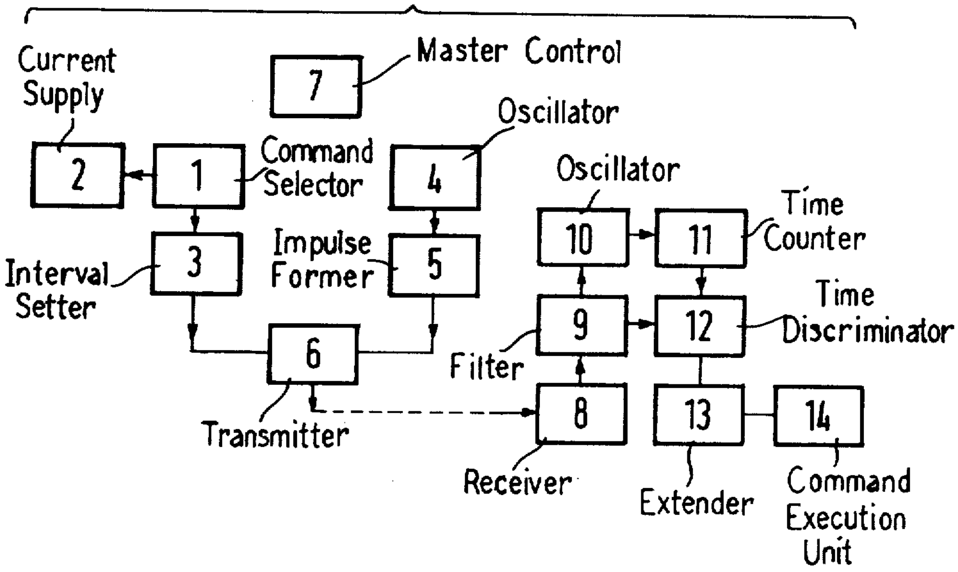
FIG. 1 illustrates by block diagram one preferred embodiment of a device of this invention.

In the arrangement illustrated in principle in FIG. 1, the transmitter has a selector 1 with the aid of which the transmitter is adjusted such that the emission of an impulse pair is triggered in which the starting impulse and the final impulse define the time interval characterizing the respective command. The command selector 1, for example, is manually operated via operation knobs, levers, switches etc. This command selection is preferably simultaneously coupled to the activation of the current supply 2 so that the current supply, for example, an electric battery, is simultaneously switched on and the transmitter is supplied with current when the selection is activated in a resting transmitter.

Figure 2:
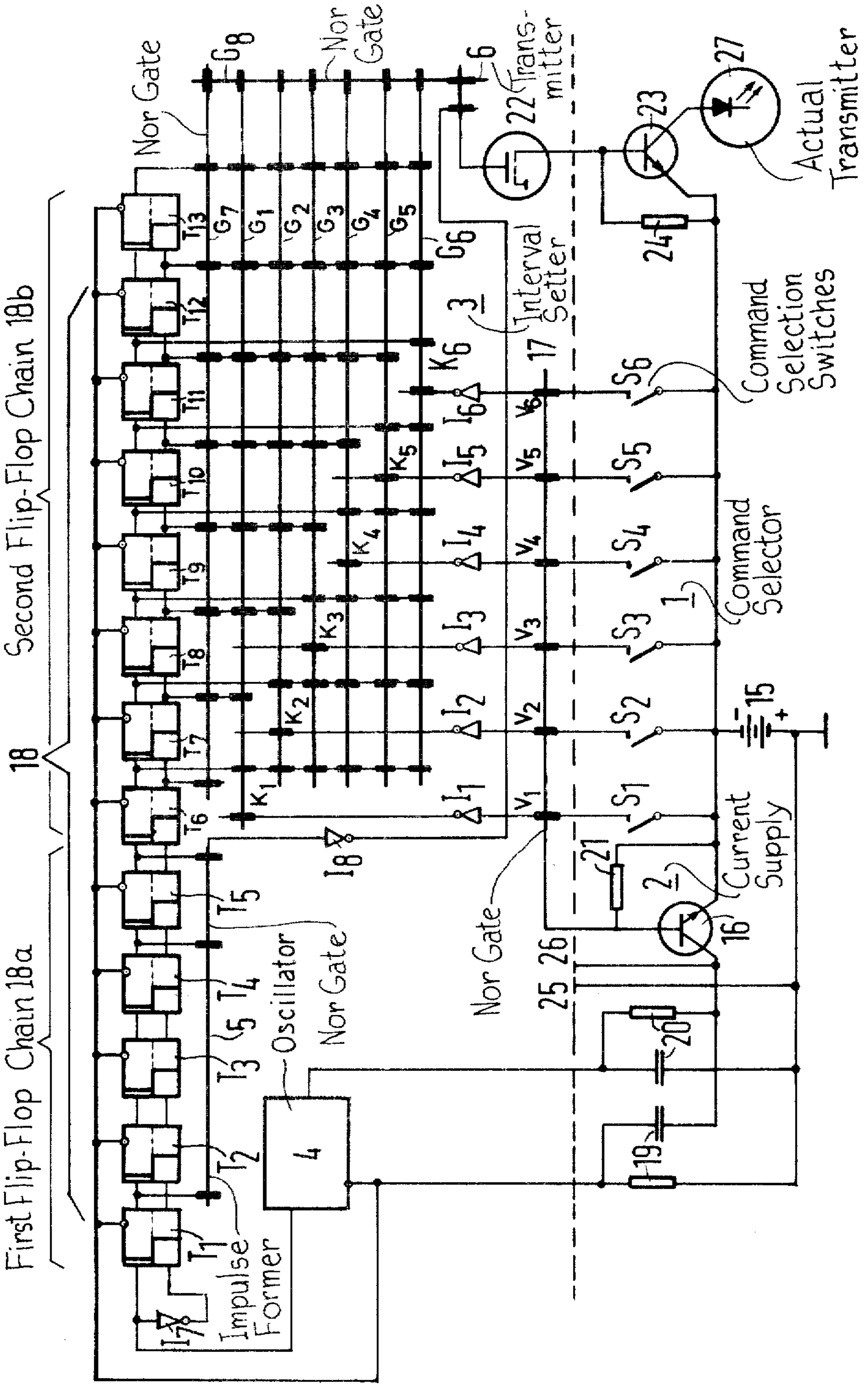
FIGS. 2 and 3 schematically illustrate in greater detail the transmitter and receiver, respectively.
Figure 3:
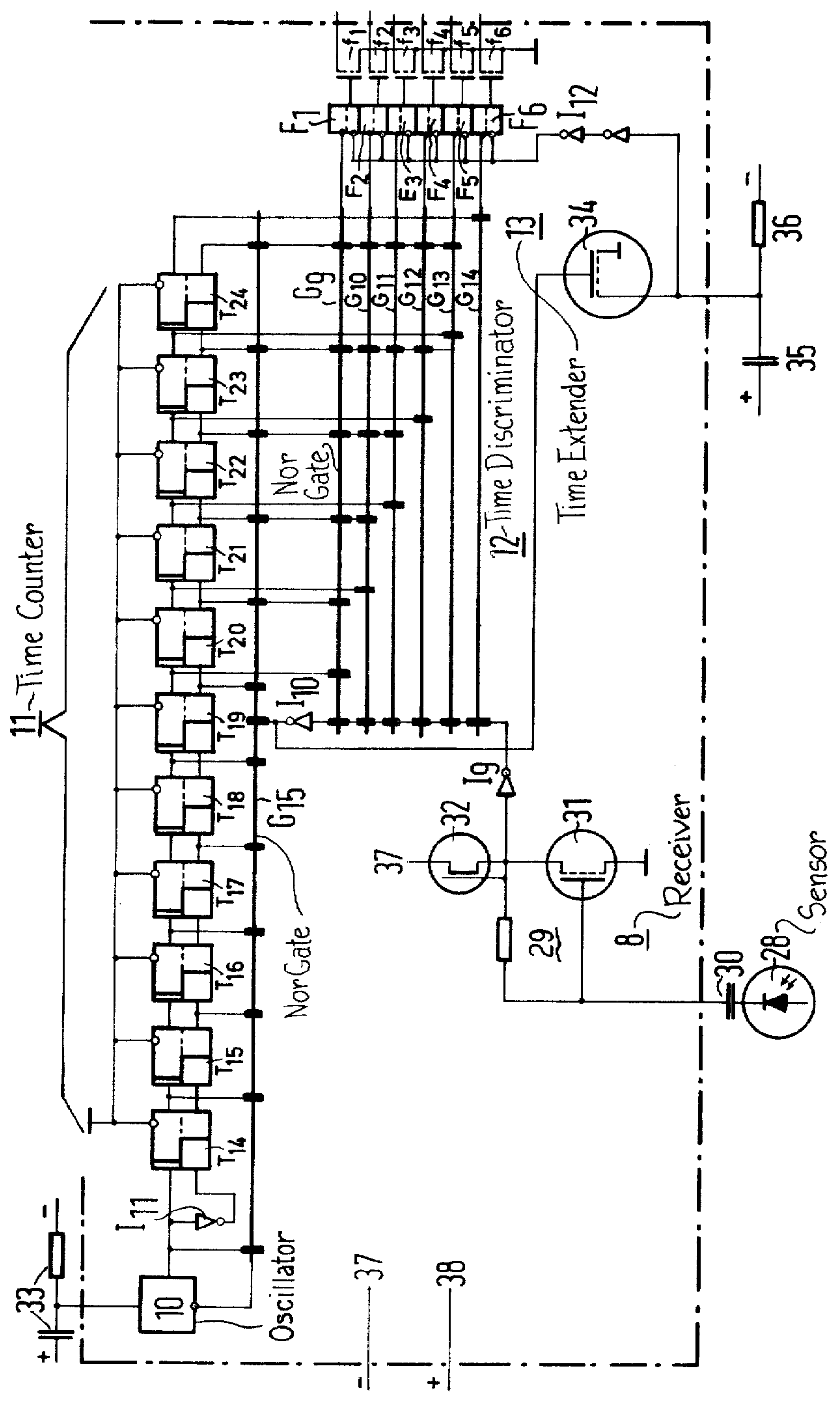

The command selector 1 directly effects the time interval setter 3 in the sample embodiment described with the aid of FIGS. 1, 2 and 3. The time interval setter determines the chronological time interval between the starting impulse and the final impulse. An oscillator 4 such as a simple RC oscillator establishes the time base for the impulse former 5. This impulse formation is constructed such that the intervals assigned to the individual commands of the command inventory do not proportionally increase in length between the starting impulse and the final impulse but rather are increasing in length in relation to the number of the respective command in the command inventory, in sequence. The impulse pairs are delivered to a transmitter 6. The coordination of the various functions in the transmitter are controlled by a master control 7.

The impulse pairs arriving from the transmitter are changed back into electrical impulses in the receiver 8 having a sensor 28. They are then transmitted to a filter 9 which insures that the starting impulse keeps the receiver oscillator 10 and the time counter 11 connected at the output side of the receiver ready. The time discriminator 12, on the other hand, receives not only the information of the starting impulse but also the information of the final impulse so that the filter 9 transmits at least the arriving final impulse to the time discriminator 12. On the other hand, the time measuring member 11 also effects the discriminator and can thus convey the information of the starting impulse to the time discriminator. It becomes clear that the circuit blocks 11 and 12 have to be structured such that they are capable of correctly recognizing the number p of the "lengthened" impulse pairs so that a conformity of the design with the structure of the transmitter is required there, also. In the present example, an extension stage 13 is also connected at the outlet side of the time discriminator where the short impulse series produced in the discriminator are transformed into a form suitable for the control of the elements which carry out the command.

The actual circuitry can be embodied as shown in FIGS. 2 and 3, respectively. There, a command inventory of six commands is provided, each of which can be selected individually or in combination by a corresponding closing of the switches $S_1, S_2, \ldots S_6$, and can be transmitted to the receiver. The switches $S_1 \ldots S_6$ thus form a part of the command selector in accordance with FIG. 1.

By means of closing each of the switches $S_1 \ldots S_6$, the transmitter is activated (if this was not already done by means of one of the switches). For this purpose, a DC voltage source 15, for example a battery, a switch-on transistor 16, and a NOR gate 17, provided with six linkage points $V_1 \ldots V_6$ is provided. Each one of said respective linkage points $V_1 \ldots V_6$ is in direct contact with one of the respective switches $S_1 \ldots S_6$.

In accordance therewith, the switch-on transistor 16 receives a switch-on voltage when one of the first switches $S_1 \ldots S_6$ is closed. Subsequently the collector circuit of the transistor 16 and the oscillator 4, for example, a RC-oscillator, are activated. The oscillator 4 produces a frequency of 60 kHz, for example.

For purposes of a clear illustration FIGS. 2 and 3 merely illustrate the NOR gates as thickened lines of long length and their logic points as short thick dashes which are connected to the corresponding switching points of the remaining elements by means of corresponding lines, each representing an electrical conductor. Except for the oscillator 4 or 10, respectively, the remaining elements are shown with conventional symbols.

The frequency of 60 kHz produced by the oscillator 4 is applied in the transmitter to a chain 18 consisting of 13 frequency divider cells $T_1 \ldots T_{13}$ connected in series and divided into a first flip-flop chain 18*a* and a second flip-flop chain 18*b*. Accordingly the frequency of 60 kHz is successively halved so that at the output of the last cell $T_{13}$ a frequency of about 9 Hz is present. The cells $T_1 \ldots T_{13}$ thus oscillate slower the higher the index of the cell is.

Each cell is individually constructed as a toggle flip-flop. Each cell $T_1$ through $T_{13}$ exhibits a preparation pulse and a release pulse, thus a master and a slave, and also a reset input and an output at zero which lies on the same flip-flop side. The one input of each of the cells $T_1 \ldots T_{13}$ is used as a preparation pulse and the second is used as a release pulse. The outputs of the frequency divider cells $T_1$ through $T_{12}$ are used as a preparation pulse and as a release pulse for the cell respectively connected at the output side. The divider cells $T_1$ through $T_6$ are used for the control of the impulse former 5 and the remaining divider cells $T_7$ through $T_{13}$ are used for the control of the interval setter 3.

Each of the switches $S_1 \ldots S_6$ does not only operate the switch-on transistor 16 via one of the respective logic members $V_1 \ldots V_6$ in the current supply NOR gate 17, but also one respective logic point $K_1$ or $K_2$ or $\ldots K_6$ of a respective additional NOR gate $G_1$ or $G_2$ or $\ldots G_6$. Each of the NOR gates $G_1$ through $G_6$ has eight additional logic points, not referenced separately, along with the logic points just mentioned. Via one inverter $I_1 \ldots I_6$, the logic points, yet to be described, are applied to the outputs of the last eight cells of the frequency divider chain $T_1 \ldots T_{13}$.

The output of the NOR gates $G_1 \ldots G_6$, forming the interval setter 3 and respectively loaded by one of the switches $S_1 \ldots S_6$ of the selection 1, is respectively connected with one of the logic points of a joint output gate $G_8$ which is also structured as a NOR gate. An additional logic point of the output gate $G_8$ is provided for the output of an additional NOR gate $G_7$ having all together eight logic points. These logic points are respectively applied to the preparation pulse in the output of the divider cells $T_6$ through $T_{12}$. The last or eighth logic point of the gate $G_7$ is conductively connected to the release pulse of the last divider cell $T_{13}$.

Each of the NOR gates assigned to the switches $S_1 \ldots S_6$ exhibits nine logic points all together. In the gate $G_1$ assigned to the switch $S_1$ the first logic point $K_1$ of $S_1$ is loaded via the inverter $I_1$. In the gate $G_2$, assigned to the switch $S_2$, the second logic point $K_2$ is loaded by $S_2$. In $G_3$, the third logic point $K_3$ is loaded by $S_3$. In $G_4$, the fourth logic point $K_4$ is loaded by $S_4$. In $G_5$, the fifth logic point $K_5$ is loaded by $S_5$. In $G_6$ the sixth logic point $K_6$ is loaded by $S_6$. The second logic point of $G_1$ and the first logic points of $G_2$ through $G_6$ all connect at the release input of $T_8$. The first logic point of $G_7$, however, connects to the preparation input of $T_8$. The third logic point of $G_1$ connects to the preparation input of $T_9$. The fourth logic points of $G_1$ and $G_2$ connect to the preparation pulse of $T_9$. The fifth logic points of $G_1$ through $G_3$ connect to the preparation pulse of $T_{10}$. The sixth logic points of $G_1$ through $G_4$ connect to the preparation pulse at the input of $T_{11}$. The seventh logic points of $G_1$ through $G_5$ connect to the preparation pulse at the input side of $T_{12}$. The eighth logic points of the gates $G_1$ through $G_6$ connect to the preparation pulse of $T_{13}$. The ninth logic points of the gates $G_1$ through $G_6$ connect to the release pulse in the output of $T_{13}$. The third logic point of $G_2$ and the second logic points of $G_3$ through $G_6$ connect to the release pulse at the input of $T_8$, the fourth logic point of $G_3$ and the third logic points of $G_4$ through $G_6$ connect to the release pulse at the input of $T_9$. The fifth logic point of $G_4$ and the fourth logic points of $G_5$ and $G_6$ connect to the release pulse at the input of $T_{10}$. The sixth logic point of $G_5$ and the fifth logic point of $G_6$ connect to the release pulse of $T_{11}$. The seventh logic point connects to the release pulse at the input of $T_{12}$. Accordingly, the assignment of the logic points of the NOR gates $G_1$ through $G_7$ in relation to the switches $S_1$ through $S_6$ and the divider cells $T_7$ through $T_{13}$ are not described since they are obvious from the drawing (FIG. 2).

The frequency of 60 kHz, produced by the oscillator 4, reaches the first divider cell $T_1$ of the flip-flop chain $T_1 \ldots T_{13}$, whereby the pulse separation between preparation pulse and release pulse is attained by an inverter $I_4$ bridging the two inputs of $T_1$. The third input of all divider cells $T_1 \ldots T_{13}$ is held at one and the same potential. The outputs of the frequency divider cells $T_1 \ldots T_{12}$ are used as a preparation pulse and as a release pulse for the cell respectively connected at the outlet side. As already described above, the cells $T_6 \ldots T_{13}$ are connected to the interval setter 3, i.e. to the NOR gates $G_1 \ldots G_7$. The first five cells $T_1 \ldots T_5$, on the other hand, are connected to the impulse shaper 5.

The impulse former 5 is formed by a NOR gate having three logic points. The first logic point is connected to the release pulse at the output of the divider cell $T_1$ and accordingly has the carrier frequency of 30 kHz. The central logic point is connected to the release pulse at the output of the divider cell $T_4$ and accordingly has a frequency of 3.15 kHz. The last logic point connects to the release pulse at the output of $T_5$ and thus has the frequency of 15,750 Hz. The carrier frequency of 30 kHz running through the impulse former is scanned with the pulse of the two lower frequencies and impulse sequences of corresponding length are produced in this manner. The pulse sequences reach via an inverter $I_8$ the one input of an output stage 6, also structured as a NOR gate, whereas the second logic point of the output stage 6 is loaded by the output of the interval setter 3, thus the NOR gate $G_8$.

The two RC members 19 and 20 are used to determine the time constants of the oscillator (RC member 19) or for resetting of the electrical condition of the transmitter after it is switched on into a definite output position (RC member 20) by means of the selector 1.

The output of the output stage 6 controls a MIS field effect transistor 22, whose source-drain path supplies the grid potential for the base electrode of a bipolar output transistor 23. The emitter voltage for transistor 23 is supplied via the emitter-base path of the switch-on transistor 16, as shown in FIG. 2, in the same manner as the source-drain voltage of the field effect transistor. The collector current of the output transistor 23 is the carrier of the impulse pairs to be transmitted to the receiver. The collector current of transistor 23 thus controls the actual transmitter 27 which is provided in the sample embodiment by a semiconductor infrared luminescence diode.

When one or more of the switches $S_1 \ldots S_6$ of the selector 1 are switched on, the frequency divider flip-flop chain 18, the impulse former NOR gate 5 and also the gate assigned to the respective switch are activated in the interval setter 3. The starting impulse is emitted as soon as the divider cell $T_6$ and the gate $G_7$ is activated. The final impulse or, if several switches are activated, the final impulses are activated when the corresponding gates $G_1$ through $G_6$ are released by the frequency divider flip-flop chain.

The arrangement is designed such that the impulse pair selected is cyclically emitted for such time until the respective switch in the selector 1 remains closed.

The base-emitter resistances 24 and 21 are used for the stabilization of the operating conditions of the two bipolar transistors 16 and 23. The output 25 is used for the supply of the drain connections of the drive transistors provided in the divider cells $T_1 \ldots T_{13}$, in the NOR gates, and in the oscillator 4. The output 26 is used for the supply of the source connections of said drive transistors. (It is noted that in these components only MOS field effect transistors are provided so that the circuit contains only MOS field effect transistors, except for the two transistors 16 and 23.)

The receiver, illustrated in FIG. 3, receives the signals emitted by the infrared diode 27 of the transmitter component by means of a sensor which responds to infrared radiation, such as a phototransistor which loads the input amplifier 29 of the receiver via a capacitor 30. The input amplifier 29 of receiver 8 is formed by the combination of a self-conducting MOS field effect transistor 32 and a self-blocking MOS field effect transistor 31 as shown in FIG. 3. The output of the MOS field effect transistor 31 operates an inverter $I_9$, and said inverter operates an arrangement of seven NOR gates $G_9 \ldots G_{15}$ which are loaded by a chain of frequency divider cells in a similar manner as the transmitter in accordance with FIG. 2. Obviously, the sensor 28, the capacitor 30, the input amplifier 29 and the inverter $I_9$ together form the input amplifier 29 of the sensor 8 which transmits the impulse pairs received after conversion to a purely electrical form and via a filter 9 to the oscillator 10, the time counter 11, and the time discriminator 12. The inverter $I_9$ is constructed as a Schmitt-trigger in this embodiment.

The impulses, supplied via the inverter $I_9$, first connect to the input of six NOR gates $G_9 \ldots G_{14}$ and a logic point of the NOQ gate $G_{15}$ via an inverter $I_{10}$. The output of the NOR gate $G_{15}$ is applied to the oscillator 10 of the receiver. The gates $G_9 \ldots G_{14}$ therefore represent the essential component of the time discriminator 12. The time counter is comprised of a chain 11 consisting of 11 equal flip-flop elements $T_{14} \ldots T_{24}$ which correspond in construction to the cells $T_1 \ldots T_{13}$ of the flip-flop chain 18. In the same manner as in the chain 18, the first cell is provided with an inverter $I_{11}$ at the input of cell $T_{14}$ between the preparation pulse and the release pulse.

The NOR gate $G_{15}$ loaded via the inverter $I_{10}$ with the impulse pairs supplied by the sensor and the input amplifier 29 has thirteen logic points in all, of which one is already reserved for the impulses supplied by the input amplifier 29, and a second is reserved for the activation of the oscillator 10. The gate $G_{15}$ is also simultaneously used for connecting the oscillator 10 of the receiver. Of the remaining 11 logic points, one is connected to the output of the flip-flop cells of the time counter 11 as shown in FIG. 3. Therefore in the cells $T_{14}$, $T_{16}$, $T_{18}$ the release pulse is connected. In the remaining cells $T_{15}$, $T_{17}$, $T_{19}$ through $T_{24}$, the preparation pulse in the output of the respective frequency divider cell is connected to one respective logic point of the NOR gate $G_{15}$. Moreover, the output of $G_{15}$ which activates the oscillator operates the output of the oscillator 10 which is loading the chain 11. Therefore, thanks to the properties of $G_{15}$ as a NOR gate, the activation of the oscillator 10 and thus the time counter 11 is facilitated.

Due to the selection made by its RC-member, the oscillator 10 produces a frequency of 40 kHz which is applied to the inverted input of $T_{14}$. Then the frequency of 20 kHz appears at the output of $T_{14}$, the frequency of 10 kHz appears at the output of $T_{15}$, the frequency of 5 kHz appears at the output of $T_{16}$, the frequency of 2.5 kHz at the output of $T_{17}$, 1.25 kHz at $T_{18}$, 625 Hz at $T_{20}$, 31.25 Hz at $T_{21}$, about 15.6 Hz at $T_{22}$, about 7.8 Hz at $T_{23}$ and about 3.9 Hz at $T_{24}$. The different dimensions of the frequencies produced by the oscillators 4 and 10 were made so the transmitter impulses in the simplest possible circuit preferably lie in relation to the time windows so that approximately equal relative tolerances result in frequency displacements in both directions.

Of the NOR gates $G_9 \ldots G_{14}$ of the time discriminator 12, the gate $G_9$ having seven logic points in all is assigned to the switch $S_1$ of the selector 1 in the transmitter. One of these logic points, namely the first, is used—as in the remaining gates $G_{10} \ldots G_{14}$—for loading the following logic point by means of input amplifier 29. The remaining logic points are applied to the preparation pulse of the outputs of the last five frequency divider cells $T_{20} \ldots T_{24}$.

The gate $G_{10}$ assigned to switch $S_2$ has six logic points in all. The gate $G_{11}$, assigned to the switch $S_3$, has five logic points in all. The gate $G_{12}$, assigned to the switch $S_4$, has four logic points in all. The gate $G_{13}$, assigned to $S_5$, has three in all. The gate $G_{14}$, assigned to $S_6$, has two logic points in all. Accordingly, the first logic point respectively accepts the impulse pairs supplied by the input amplifier 29. In order to recognize the time interval between the starting and final impulse of the respectively received impulse pair, the respective following logic point and the remaining logic points are respectively connected to the preparation pulse at the output of $T_{21}$ (at $G_{10}$); at the output of $T_{22}$ (at $G_{10}$ and $G_{11}$); at the output of $T_{23}$ (at $G_{10}$, $G_{11}$ and $G_{12}$); and at the output of $T_{24}$ (at $G_{10}$, $G_{11}$, $G_{12}$, $G_{13}$). The recognizing logic point at $G_9$ connects to the release pulse in the output of $T_{19}$; at $G_{10}$ to the release pulse of $T_{20}$; at $G_{11}$ to the release pulse at the output of $T_{21}$; at $G_{12}$ to the release pulse at the output of $T_{22}$; at $G_{13}$ to the release pulse at the output of $T_{23}$; and at $G_{14}$ to the release pulse of $T_{24}$.

The gate $G_{15}$, moreover, is used as a blockade so that the receiver is held in its output position and is ready for the subsequent time measurement. When the first impulse arrives, the blockade is lifted and the oscillator 10 and the time measuring chain 11 (thus the cells $T_{14} \ldots T_{24}$) are put in receiver readiness for the related final impulse. After the final impulse has arrived and in the absence of an activation condition due to other impulse pairs having been received (closed condition of one of the switches $S_1 \ldots S_6$), the arrangement again is set for idling operation by the effect of $G_{15}$.

The oscillator 10 activated by the starting impulse of a first command transmitted by the transmitter activates the time counter 11, which puts the gates $G_9 \ldots G_{14}$ into receiver readiness for the arriving final impulses. When the final impulse arrives, only one of the gates $G_9 \ldots G_{14}$ of the time discriminator 12 is opened, whereas the remaining gates remain blocked. Therefore, the arriving final impulse respectively finds open only the one of the gates of the time discriminator 12 which is controlled by the cell $T_{19} \ldots T_{24}$ of the time counter 11, respectively corresponding to its chronological distance from the starting impulse. The final impulse is then accepted by the respectively open gate and conveyed via its output to a RS flip-flop assigned to said gate. Thus, six such RS flip-flops are provided which are referenced $F_1 \ldots F_6$ and of which one respective cell is assigned to one of the respective gates $G_9 \ldots G_{14}$, and thus to one of the respective switches $S_1 \ldots S_6$ in the transmitter component. Together these flip-flops $F_1 \ldots F_6$ form the extension stage 13. Each of these flip-flops controls the gate electrode of one respective field effect transistor $f_1 \ldots f_6$ whose source-drain circuits are separated from one another and are used in order to load one of the respective command execution units 14 to be controlled. The execution unit 14 which is programmed or structured respectively for the automatic carrying-out of the command is actuated by the selector 1 in the transmitter due to the activation by means of the respectively assigned field effect transistor $f_1 \ldots f_6$.

The RS flip-flops are directly influenced by the NOR gate $G_{15}$ as is obvious from FIG. 3. This is done via the gate electrode of an additional MOS field effect transistor 34. Via a Schmitt-trigger having an inverter $I_{12}$ connected at the outlet side, the source-drain path of transistor 34 flips back the inputs of the flip-flop cells $F_1 \ldots F_6$, which are not loaded with an impulse by the gates $G_9 \ldots G_{14}$, into the initial position as soon as the oscillator 10 is switched off by the gate $G_{15}$. The time interval therefor can be determined by the selection of the capacitor 35 and the resistance 36.

In the inventive arrangement of FIGS. 2 and 3, a time measuring chain is illustrated which is constructed of frequency dividers which insures, in correspondence with the second embodiment of the invention method, that the final impulse assigned to the p-th command is transmitted within the time interval which starts at the point of time $t_p = A + a(2^p - 1)$ and ends with the point of time $T_p = A + a(2^{p+1} - 1)$. Therefore, the arrangement corresponds with a chain of successive counters connected in series of which the first of said counters is assigned to the command number 1, the second is assigned to the command number 2, etc.

Therefore, one has as many such counters as commands are provided for the remote control. As previously mentioned, one will then assign the most frequently required command to the first counter, the second most frequently occurring command to the second counter, etc. The first counter recognizes only two digital conditions 0 and 1; the following counter recognizes the conditions 00, 01, 10 and 11; the third the conditions 000, 001, 010, 011, 100, 101, 110 and 111; etc. The desired interval extension of the inventive method is thereby obtained or reproduced, respectively.

Figure 4:
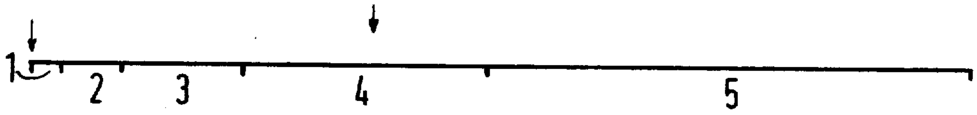
FIG. 4, in conjunction with a second embodiment of the invention, shows the various operating conditions of a counting chain which can be employed as a time control member or as time measuring member, respectively, as it is utilized in a purely electrical form, that is in the form of a frequency divider flip-flop chain as illustrated in FIGS. 2 and 3.

FIG. 4 illustrates this in detail for one command inventory of four commands. The command ready for transmission can be seen as "1" in FIG. 4.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A remote control system comprising: a transmitter means for command selection and a receiver means for controlling command execution; said transmitter means selectively outputting numbered individual types of dual impulse pairs to the receiver means; the individual types of dual impulse pairs differing by a time span between a start impulse and a final impulse; the receiver means including means for responding to the differing time span between the individual types of the dual impulse pairs and means for respectively assigning each of the individual types of dual impulse pairs received to one remote control command; said transmitter means including means for providing the final impulse in all the individual types of dual impulse pairs at the earliest at time $$t_p = A + a \cdot (2^p - 1)$$

and at the latest at time $$T_p = A + a \cdot (2^{p+1} - 1)$$

after the start impulse has appeared where A and a have constant values and p represents the number of the individual type of the dual impulse pairs.

2. A system according to claim 1, characterized in that said transmitter means includes: a command selector means having a plurality of switches, one individual type of the dual impulse pairs being assigned to each of said switches; interval setter means for determining the time span between the start impulse and the final impulse of the dual impulse pair to be transmitted in accordance with a command given by the command selector means switch which is activated; said interval setter means controlling an actual transmitter such that the actual transmitter transmits the final impulse of the respectively transmitted dual impulse pair at time $t_p$ at the earliest and at time $T_p$ at the latest after the start impulse has occurred where p is the number of the activated switch; first and second flip-flop chains pulse-controlled by an oscillator; the first flip-flop chain controlling an impulse former and the second flip-flop chain controlling said interval setter means; said impulse former and said interval setter means each being designed as a combination of logic gates and jointly control a transmitter comprising a logic gate which controls said actual transmitter.

3. A system according to claim 2, characterized in that said interval setter means comprises NOR-gates and inverters, one inverter and one respective NOR-gate being assigned to each of the respective switches of the command selector means; each of the respective switches being connected to a linkage point of the respective NOR-gate; the number of flip-flop cells of the second flip-flop chain controlling the interval setter means being greater than the number of the switches provided in the command selector means.

4. A system according to claim 2, characterized in that the impulse former comprises a NOR-gate having at least two inputs respectively connected to an output of each of at least two flip-flop cells of the first flip-flop chain controlling the impulse former; an output of the impulse former being connected together with the interval setter means to an input of said transmitter connected to the actual transmitter.

5. A system according to claim 2, characterized in that the common oscillator is connected to one input of the first flip-flop chain assigned to the impulse former; and two outputs of a last flip-flop cell of the first chain connecting to an input of a first flip-flop cell of the second flip-flop chain assigned for control of the interval setter means.

6. A system according to the claim 2, characterized in that an output of the interval setter means is provided by means of a NOR-gate whose inputs are respectively controlled by one of the remaining NOR-gates forming the interval setter means.

7. A system according to claim 2, characterized in that the transmitter comprises a NOR-gate whose two inputs are respectively controlled by an output of the interval setter means or by an output of the impulse former.

8. A system according to claim 2 wherein a NOR-gate is connected to a current supply via the switches of the command selector means.

9. A system according to claim 2, characterized in that the first flip-flop chain controlling the impulse former consists of five flip-flop cells connected in series; and the impulse former comprises a NOR-gate having three logic inputs which are respectively loaded by an output of each of the first and the two last flip-flop cells of the first flip-flop chain.

10. A system according to claim 2, characterized in that the flip-flop cells forming the first and second flip-flop chains comprise toggle flip-flops.

11. A system according to claim 1 wherein said receiver means includes a sensor responding to signals emitted by an actual transmitter in the transmitter means; said sensor connected to control a time discriminator which is simultaneously controlled by a time counter.

12. A system according to claim 11, characterized in that the time discriminator comprises a number of NOR-gates corresponding with a number of switches in a command selector means in the transmitter means, said NOR-gates being controlled by pulse outputs of a flip-flop chain forming the time counter, outputs of said NOR-gates being provided for control of command execution.

13. A system according to claim 12, characterized in that in case of six switches in the command selector means the flip-flop chain of the timing counter consists of eleven flip-flop cells connected in series and the time discriminator consists of six NOR-gates.

14. A system according to claim 12, characterized in that a loading of the NOR-gates of the time discriminator proceeds by means of said sensor via a Schmitt trigger having negating properties.

15. A remote control system comprising:

(a) a transmitter means having
  (i) a command selector means with a plurality of command selection switches for entering individual commands;
  (ii) an oscillator;
  (iii) an impulse former means connected to the oscillator and providing a start impulse and a final impulse as an impulse pair for each individual command;
  (iv) means connecting the impulse former means to an interval setter means;
  (v) the interval setter means connected to the command selector means for establishing a time span for each impulse pair such that relative to the start impulse the final impulse occurs at the earliest at time $t_p$ and at the latest at time $T_p$ where $$t_p = A + a \cdot (2^p - 1)$$

$$T_p = A + a \cdot (2^{p+1} - 1)$$

where A and a are constants and p represents a number of the impulse pair associated with each command; and
(b) receiver means for decoding the impulse pairs.

16. A remote control system comprising:

(a) a transmitter means having
  (i) a command selector means with a plurality of command selection switches for entering individual commands;
  (ii) an oscillator;
  (iii) an impulse former means connected to the oscillator and providing a start impulse and a final impulse as an impulse pair for each individual command;
  (iv) means connecting the impulse former means to an interval setter means;
  (v) the interval setter means connected to the command selector means for establishing a time span for each impulse pair such that relative to the start impulse the final impulse occurs at the earliest at time $t_p$ and at the latest at time $T_p$ where $$t_p = A + a(p - 1)p/2$$

$$T_p = A + a(p + 1)p/2$$

where A and a are constants and p represents a number of the impulse pair associated with each command; and
(b) receiver means for decoding the impulse pairs.

17. A remote control system comprising:

(a) a transmitter means having
  (i) a command selector means with a plurality of command selection switches for entering individual commands;

(ii) an impulse former means providing a start impulse and a final impulse as a numbered impulse pair for each individual command;

(iii) interval setter means connected to the command selector means for establishing a time span for each impulse pair such that relative to the start impulse the final impulse occurs at the earliest at time $t_p$ and at the latest at time $T_p$ and where time span window $T_p - t_p$ progressively increases with increasing impulse pair number; and (b) receiver means for decoding the impulse pairs.

* * * * *